United States Patent
Vinekar

Patent Number: 6,031,431
Date of Patent: Feb. 29, 2000

[54] METHODS AND APPARATUS FOR IMPLEMENTING MODULATORS AND PROGRAMMABLE FILTERS

[75] Inventor: Sanjay R. Vinekar, Cranbury, N.J.

[73] Assignee: Hitachi America, Ltd., Tarrytown, N.Y.

[21] Appl. No.: 09/172,562

[22] Filed: Oct. 14, 1998

Related U.S. Application Data

[60] Provisional application No. 60/064,956, Nov. 7, 1997.

[51] Int. Cl.[7] .............................. H04L 27/20; H04L 27/36
[52] U.S. Cl. ......................... 332/103; 375/261; 375/298; 708/313; 708/316; 708/319
[58] Field of Search .................................... 332/103, 104, 332/105; 375/261, 298; 708/313, 316, 319

[56] References Cited

U.S. PATENT DOCUMENTS

| | | | |
|---|---|---|---|
| 5,633,893 | 5/1997 | Lampe et al. | 375/297 |
| 5,783,974 | 7/1998 | Koslov et al. | 332/103 |
| 5,930,299 | 7/1999 | Vannatta et al. | 375/269 |

*Primary Examiner*—Siegfried H. Grimm
*Attorney, Agent, or Firm*—Straub & Pokotylo; Michael P. Straub

[57] ABSTRACT

Methods and apparatus for implementing digital modulators and programmable interpolation circuits used in such modulators are described. In one embodiment a modulator is implemented using an programmable interpolator which performs both pulse shaping and interpolation functions followed by a mixer which, in turn, is followed by a band shifting interpolator which operates at a fixed interpolation rate. By using the programmable interpolator/Nyquist filter of the present invention, multiple input sampling frequencies can be supported with the need to make the band shifting interpolator programmable. In addition, pulse shaping and interpolation operations are combined leading to a more efficient overall modulator design.

30 Claims, 4 Drawing Sheets

6,031,431

METHODS AND APPARATUS FOR IMPLEMENTING MODULATORS AND PROGRAMMABLE FILTERS

RELATED APPLICATION

This application is a continuation-in-part of pending U.S. Provisional Patent Application Ser. No. 60/064,956 titled "METHODS AND APPARATUS FOR IMPLEMENTING PROGRAMMABLE NYQUIST FILTERS AND INTERPOLATORS" which was filed on Nov. 7, 1997 and which is hereby expressly incorporated by reference.

FIELD OF THE INVENTION

The present invention is directed to methods and apparatus for implementing digital communication systems and, more particularly, to programmable filters, interpolators and modulators suitable for use in, e.g., transmitting digital information.

BACKGROUND OF THE INVENTION

The upstream transmissions on a digital cable system, e.g., transmission from a subscriber to a head-end such as a cable office, are typically done in the 5–65 MHz spectrum. Such transmissions may use symbol rates of, e.g., up to 2.5 MHz. For a fully digital implementation of an upstream modulator, RF Carrier samples are available at a frequency Fc which is above $2\times RF_{max}$ frequency. Hence for the mixing process to be done digitally, the base-band signal containing the information must also be available at an Fc sampling rate.

In many digital transmission systems the data symbol rate is programmable over a wide range (typically 64 Kbaud to 2.5 Mbaud). In such systems the modulator is frequently required to shape the symbol pulses, and interpolate them to the fc sample rate. Since a number of pulse shape specifications already exist in the industry, it is desirable for purposes of flexibility that both the Pulse Shaping Filter (Nyquist Filter) and/or the Interpolator filter used in a digital transmission system be programmable.

In various known modulators, the pulse shaping (Nyquist) filter and interpolator filter have been implemented as separate filters.

In modulators, the Nyquist filter must be designed so that it is capable of working at the highest symbol rate supported by the modulator. As the symbol rate increases, the complexity of multiplier hardware also increases. Thus, at the highest symbol rate, the Nyquist filter will require the most resources since it will use the most complex hardware implementations.

A programmable interpolator, intended to work with a modulator's programmable Nyquist filter, has to be designed so that it is capable of working at the slowest symbol rate. Interpolators generally require multiplier hardware resources proportional to the maximum interpolation ratio to be supported. The slower the input symbol rate, the greater the sampling rate translation that must be performed by the interpolator to translate the input waveform(sampled at input symbol rate) to an output waveform(sampled at a much higher sampling rate).

Thus, in contrast to the pulse shaping filter, the interpolator requires the most resources to implement when it is at the slowest symbol rate.

The conflicting requirements for hardware resources in terms of Nyquist and Interpolator filters leads to a sub-optimal implementation in terms of hardware efficiency when separate Nyquist and interpolator filters are used.

In order to improve implementation efficiency and thereby reduce the cost of digital modulators, there is a need for new and improved methods of implementing Nyquist and interpolator filters used in, e.g., digital modulators.

SUMMARY OF THE PRESENT INVENTION

The present invention is directed to methods and apparatus for implementing programmable filters, interpolators, and modulators suitable for use in, e.g., transmitting digital information.

In accordance with one embodiment of the present invention, a programmable pulse shaping Nyquist filter is combined with an interpolator filter. The programmable pulse shaping/interpolator filter of the present invention can be implemented using fewer hardware multiplier resources than is the case when equivalent individual Nyquist and interpolator filters are implemented. The combined, programmable, pulse shaping interpolator filter of the present invention employs a larger consolidated single memory, e.g., to store filter tap weights, than might be used to implement separate pulse shaping and interpolator filters. However, the filter implementation of the present invention provides for multiplier and other hardware savings as compared to known separate filter implementations.

The increase in memory size, relative to individual filter implementations, found in the filter of the present invention is a good trade-off since memory is less expensive in silicon area as well as power consumption than the multipliers and other hardware that are eliminated through the use of the methods and apparatus of the present invention.

One particular embodiment of the present invention is directed to combining a programmable Nyquist filter with a programmable interpolator. The programmable filter of the present invention is implemented as a primary Nyquist filter with a set of reusable taps. If the primary Nyquist filter uses N taps, then the programmable filter of the present invention provides a total of N×I taps, where I is the programmable interpolation ratio. This is achieved by re-using the filter taps with different filter weights obtained from memory.

Note that when I is high, the symbol rate is proportionately low, and hence hardware resources can be effectively shared between the Nyquist and Interpolator filter operations such that total multiplier hardware is proportional to N.

In order to implement such a multi-function filter, one embodiment of the present invention uses a single large memory to hold N×I tap weights.

The programmable filter of the present invention can be used to implement an all digital modulator. The modulator may comprise, e.g., a programmable pulse shaping/interpolating filter of the present invention followed by a digital mixer and band shifting interpolator with a fixed interpolation ratio.

Various additional features and embodiments of the present invention are described in detail in the detailed description which follows.

DETAILED DESCRIPTION

Figure 1:
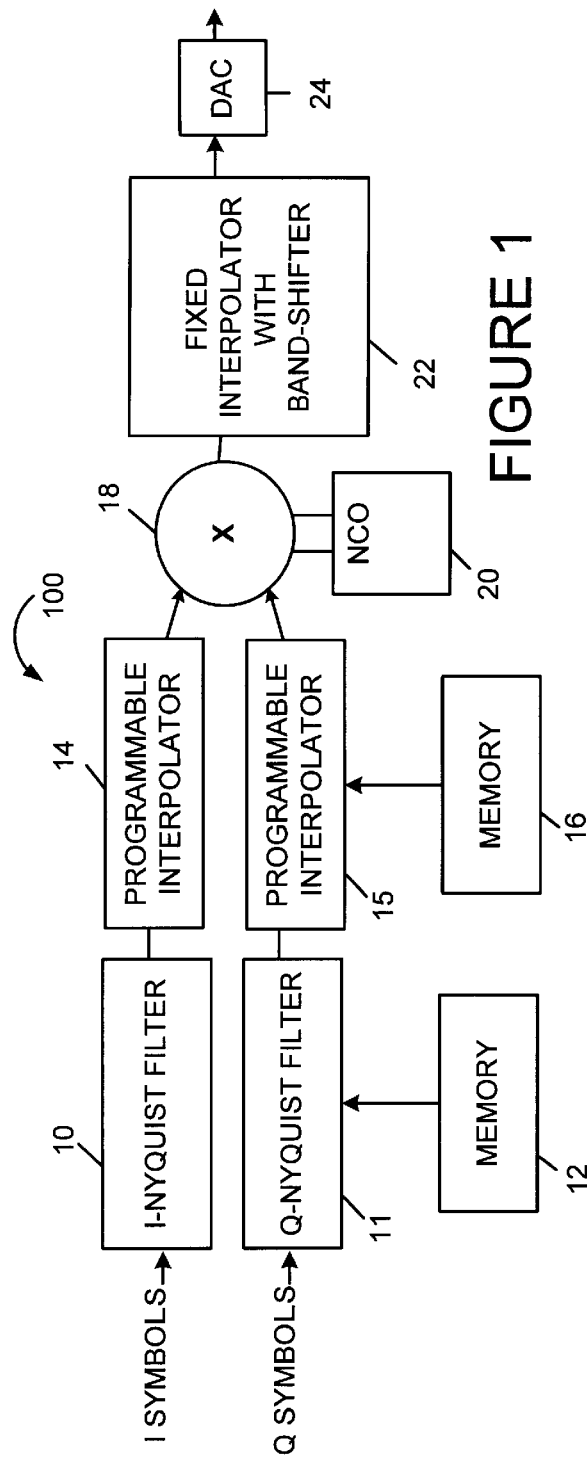
FIGS. 1 and 2 illustrate modulator systems implemented in accordance with the present invention.

FIG. 1 shows an implementation of a modulator system 100 including 2 identical Nyquist filters 10, 11 for processing the in-phase (I-) and quadrature (Q-) phase portion of a signal having a sampling rate $F_{S1}$ comprising a series of symbols having a symbol rate S. The Nyquist filters 10, 11 are implemented as finite impulse response (FIR) filters. These filters 10, 11 perform a pulse shaping operation. Since there are a number of existing communication standards requiring different pulse shape specifications, and to allow for future systems, the Nyquist filters 10, 11 are implemented as programmable FIR filters. The programmability is provided by the memory 12 which is used for storing filter tap weights.

Two identical programmable interpolators 14, 15 are used to support a wide range of interpolation ratios. The interpolators 14, 15 perform an interpolation/pulse shaping operation on the filtered I- and Q-phase signals input thereto to generate interpolated I and Q signals having a sampling rate, $F_{S2}$, equal to I times $F_{S1}$. The memory 16 provides tap weights for implementing programmable interpolators 14, 15 while the memory 12 provides tap weights for filters 10, 11.

By using programmable interpolators 14, 15 prior to mixing, subsequent circuitry may be designed to operate at fixed, pre-selected sampling rates. Thus, the band-shifting interpolator 22 can be implemented as a fixed as opposed to programmable interpolator. In addition, the frequency range which must be supported by the band-shifting interpolator can be reduced making it easier to implement than in the case where a large and/or multiple interpolation rates are to be supported by the band-shifting interpolator.

In the FIG. 1 implementation, the Nyquist filters 10, 11 use multiplier hardware proportional to the number of Nyquist filter taps N. The programmable interpolators 14, 15, are implemented as interpolator filters. The interpolator filters 14, 15 require their own multiplier hardware proportional to the highest interpolation ratio they support.

The interpolated I- and Q-signals output by the first and second interpolators 14, 15 are input to a mixer 18 which mixes the input signals with the output of a numerically controlled oscillator (NCO) 20. The mixer 18 operates at a frequency Fm which is equal to the output sampling rate $F_{S2}$ of the interpolators 14, 16. The output of the mixer 18 is processed by a band shifting interpolator 22 which has a fixed interpolation rate $I_{FS}$. The band shifting interpolator 22 shifts the carrier frequency of the interpolated signal in addition to performing interpolation. The interpolator 22 generates an output signal having a sampling rate of I times $I_{S2}$.

The output of the band shifting interpolator 22 is processed by a digital to analog converter (DAC) 24 to generate an analog signal therefrom suitable for transmission.

Figure 2:
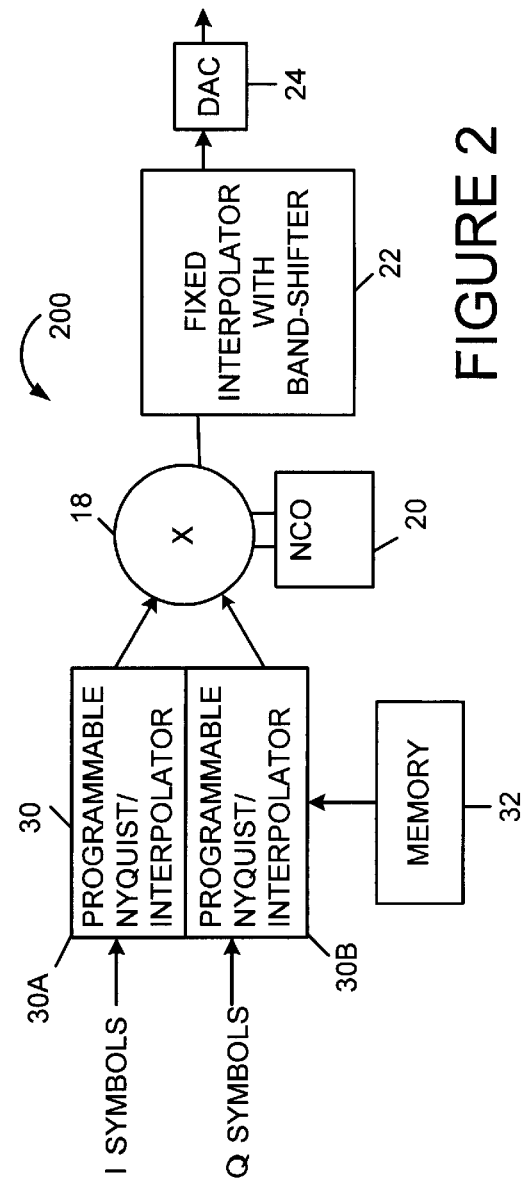

FIG. 2 illustrates a modulator 200 implemented in accordance with another embodiment of the present invention. Circuitry in the FIG. 2 embodiment which is the same as, or similar to, the circuitry of the FIG. 1 embodiment is identified using the same reference numbers. For the purpose of brevity, such circuitry will not be described again in detail.

Figure 3:
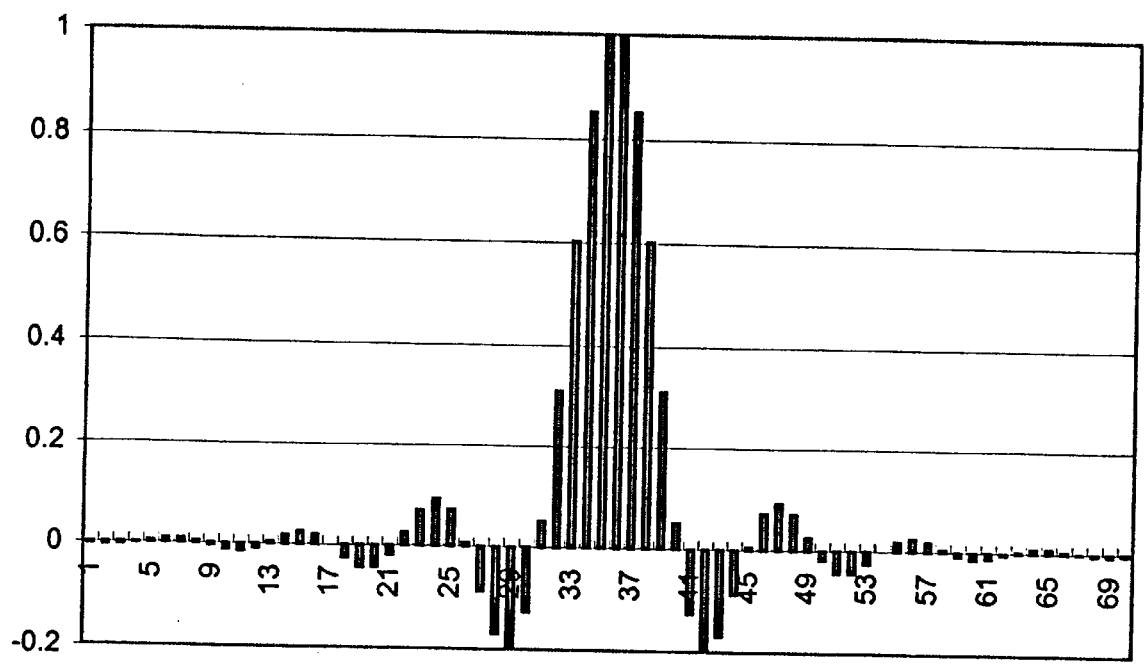
FIG. 3 illustrates a set of tap weights which may be used to implement a 70 tap FIR filter in accordance with one exemplary embodiment of the present invention.

As shown in FIG. 2, it is possible to combine the Nyquist filter and interpolator operations by constructing filter 30A and 30B with N×I taps each, where N is the number of taps in the basic Nyquist filter and I is the interpolation ratio. Two such filters 30A and 30B are shown in FIG. 2. The combination of the filters 30A and 30B results in a complex FIR filter 30. A filter, where N=14 and I=5, suitable as either of the filters 30A or 30B, is shown in FIG. 3 as a set of 70 tap weights.

While the total number of taps can be very high as the interpolation ratio increases, the multiplier hardware required to implement the filter 30A or 30B of the present invention remains constant. This is because, as the interpolation ratio (I) increases, the symbol rate decreases proportionately and, as a result, the filter hardware can be re-used to a larger degree.

The details are explained in the case of a 14 tap (N=14) Nyquist filter embodiment and a supported interpolation rate of five (I=5).

Figure 4:
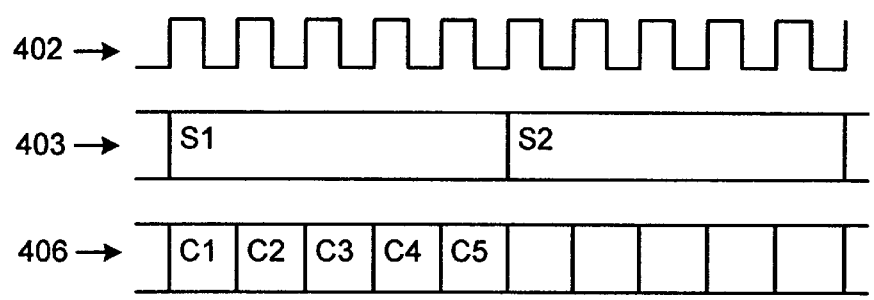
FIG. 4 illustrates various signals in the system illustrated in FIG. 3 and the timing relationship between the signals.

FIG. 4 shows the clock signal Fm 402 which is used to control the modulator 18. Since Fm is the rate at which the mixer 18 works, this is the rate at which the programmable interpolator 30 is required to output samples. Thus, in one embodiment, $F_{S2}$ is fixed at Fm with the interpolation rate I being varied, as a function of the input rate, as required to achieve the output rate Fm. The programmable interpolator 30 operators at a clock rate of $F_{S2}$=Fm. Accordingly, when I is five, $F_{S1}$ is equal to $F_{S2}/5$ meaning that a new symbol will appear at the input of the interpolator 30 every 5 clock cycles. Reference number 403 is used in FIG. 4 to indicate the input signal, comprising a series of symbols, to the programmable interpolator 30A. Note how each symbol S1, S2 corresponds to 5 interpolator clock cycles.

As discussed above, interpolation causes the sampling rate of the output signal to be increased in the exemplary embodiment by a factor of 5 to $F_{S2}$. Thus, five samples are output by the interpolator for every symbol that is processed. The samples output by the programmable interpolator 30A are represented by the third illustrated signal 406, with the letters C1, C2, ... C5 being used to indicate output samples.

In accordance with the present invention, a 14 tap FIR filter 30A or 30B can be operated such that:

During cycle C1 it uses tap weights: 1,6,11,16,21,26,31, 36,41,46,51,56,61,66 of FIG. 3.

During cycle C2 it uses tap weights: 2,7,12,17,22,27,32, 37,42,47,52,57,62,67 of FIG. 3.

During cycle C3 it uses tap weights: 3,8,13,18,23,28,33, 38,43,48,53,58,63,68 of FIG. 3.

During cycle C4 it uses tap weights: 4,9,14,19,24,29,34, 39,44,49,54,59,64,69 of FIG. 3.

During cycle C5 it uses tap weights: 5,10,15,20,25,30,35, 40,45,50,55,60,65,70 of FIG. 3.

By using different tap weights during different cycles of filter operation a single 14 tap filter now does the interpolation equivalent to a 70 tap interpolator filter through the use of additional memory to store the additional taps, e.g., filter weight coefficients used during different cycles of operation.

Figure 5:
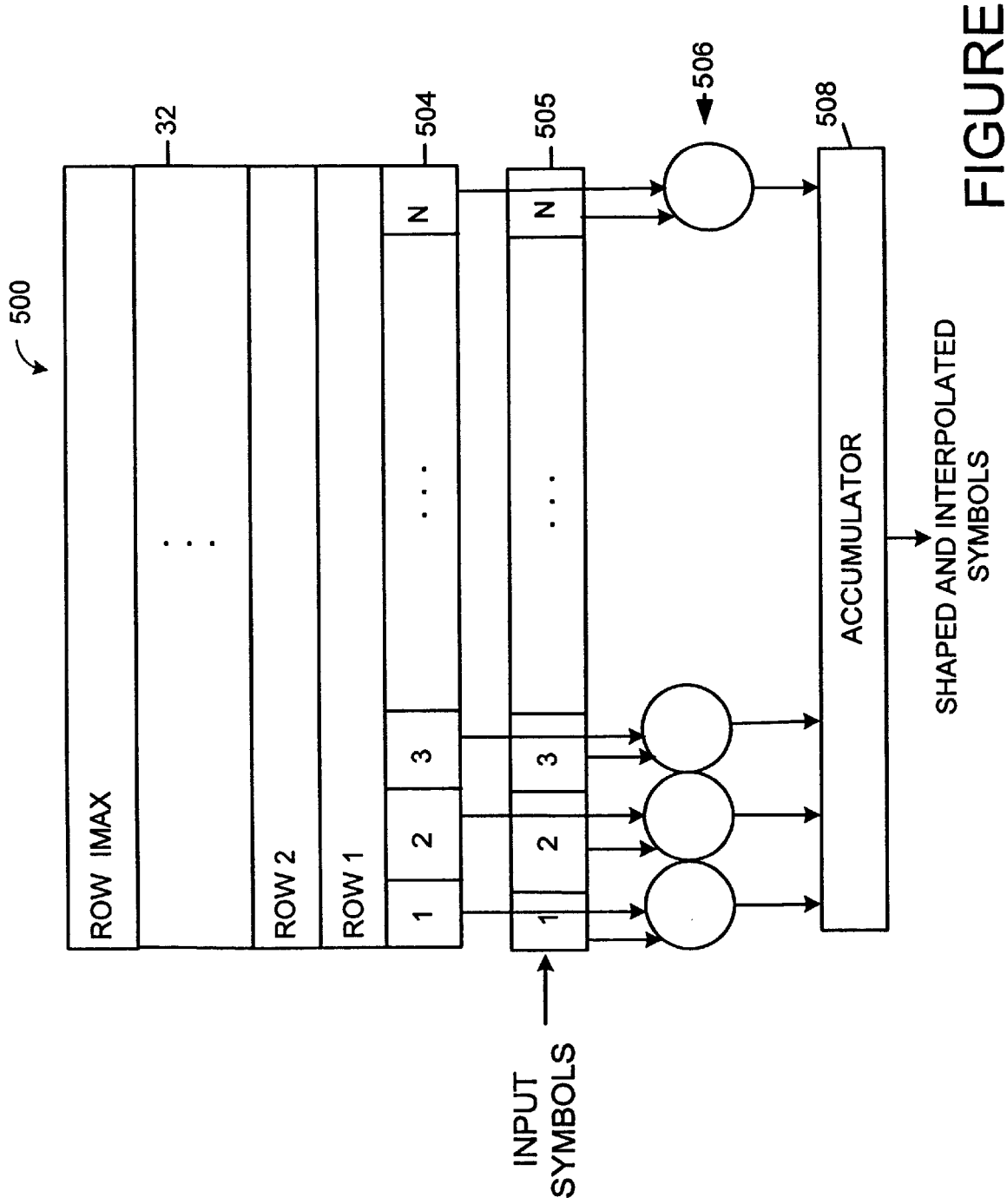
FIGS. 5 and 6 illustrate FIR filters implemented in accordance with the present invention.

FIG. 5 shows a simplified implementation of such a filter 500, i.e., an N tap Nyquist Filter with maximum interpolation ratio of $I_{max}$, suitable for use as either of the programmable filters 30A, 30B. The complex filter 30 may be implemented using two filters 500 and a common memory 32 used to share the tap weights which are used by both of the filters 500.

In the FIG. 5 embodiment, the memory 32 is used to store the tap weights that are used to implement the programmable filter 500. For this reason, the memory 32 is shown as part of the filter 500. The maximum number M of taps is equal to the maximum supported interpolation rate ($I_{max}$) times the number of taps (N), used to implement a Nyquist filter. N is determined as a function of a desired pulse shaping operation and is selected so that, in the case of an input signal having a sampling rate equal to the output sampling rate, i.e., the case where the interpolation rate is set equal to 1, the pulse shaping requirements of a selected communication standard will be satisfied.

In one embodiment the M tap weights are arranged in memory 32 in sequential memory locations. Each set of N tap weights can be treated as forming a separate row of tap weights, e.g., Row 1 through Row $I_{max}$. During each interpolator clock cycle each tap weight, 1 through N, included in a row of tap weights 504, is read out of memory and supplied as an input to a corresponding multiplier. In FIG. 5, each one of the multipliers 1 through N, used to implement the filter 500, is represented as a separate circle 506. In the FIG. 5 embodiment, a shift register 505 is used as a delay element to delay the input symbols during use. Every $I^{th}$ interpolator clock cycle (where I is the interpolation ratio), an input symbol is clocked into a register location and the register's previous contents are shifted one location to the right. Each of the N register locations is coupled to a second input of a corresponding one of the N multipliers 506 as illustrated in FIG. 5. The multipliers 506 multiply the two input values supplied thereto and output the result to the accumulator 508. The accumulator 508 sums the values input thereto and outputs the sum once every interpolator clock cycle. Thus, assuming the input symbol rate equals the input sampling rate and that the interpolator clock operates at I times the input symbol rate, I output values are output by the interpolator for each symbol input thereto.

In one particular exemplary embodiment of the present invention the memory 32, used to store the tap weights, has $I_{max}$ rows of tap weights where each row holds N tap-weights. To implement interpolation by I where I<$I_{max}$, only the tap weights from I rows of the memory are used. The last N symbols are stored in symbol registers. The Kth interpolated sample (output value) is generated by multiplying the N samples with N tap-weights stored in the Kth row of the filter pattern, and accumulating these weighted samples in the accumulator prior to outputting the accumulated value.

If a filter for I=$I_{max}$ is stored in the memory, then it is possible to use the same filter for any I which satisfies I*N=$I_{max}$, where N is an integer. This can be done by defining a programmable parameter, e.g., called STEP, which is used to increment the row address used to access the tap weights in memory for each interpolated sample.

Figure 6:
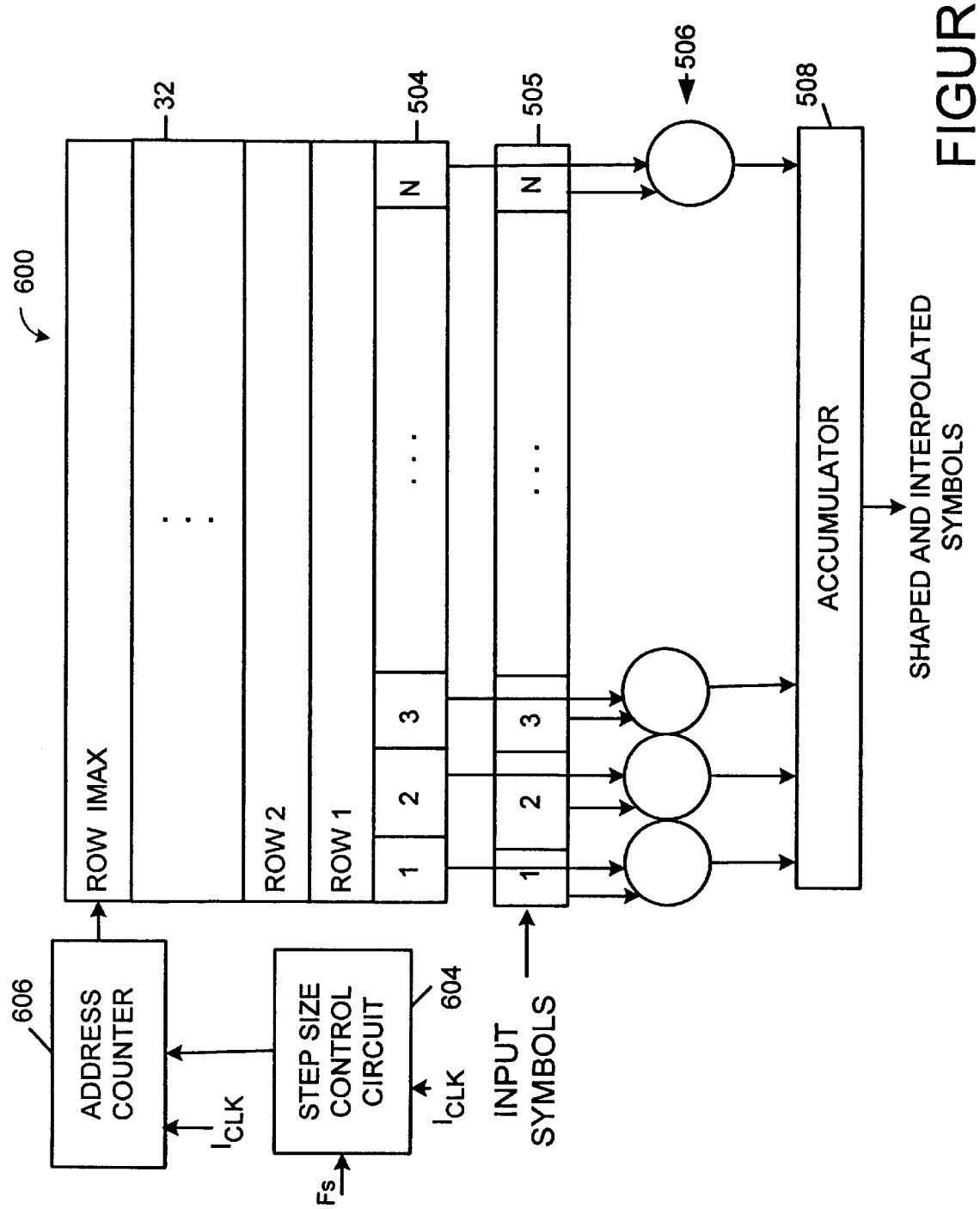

FIG. 6 illustrates a FIR filter arrangement 600 which can be used to support multiple interpolation rates up to and including an interpolation rate of $I_{max}$. The FIG. 6 embodiment is similar to the FIG. 5 embodiment However, the FIG. 6 embodiment shows address counter circuitry 606 used for generating the memory address corresponding to the start of a row of tap weights to be used during an interpolator clock cycle and a step size control circuit 604 used for incrementing the address counter 606. By adjusting the step size used to increment the address counter 606, interpolation rates which divide evenly into the maximum supported interpolation rate can also be supported.

Assuming that the basic Nyquist filter was implemented using 14 taps (N=14) and that a maximum interpolation rate of 80 was supported (Imax=80) the memory 32 would be loaded with 1120 tap weights arranged to form 80 rows with 14 tap weights per row.

The step size control circuit 604 is responsible for determining the step size by which the address counter is incremented. The circuit 604 receives as its input the input sampling rate $F_{S1}$. Stored within the circuit 604 is the output sampling rate $F_{S2}$ at which the programmable interpolator 600 is designed to output data.

The step size control circuit 604 divides the interpolator output sampling rate $F_{S2}$ by the input sampling rate $F_{S1}$ to determine the interpolation rate to be used. That is, $I_{actual}$= $F_{S2}/F_{S1}$. In accordance with the present invention input sampling rates which result in interpolation rate which divide evenly (without a remainder) into the maximum interpolation rate are supported. The step size to be used for a given input frequency is then determined to be:

$$STEP=(I_{max}/I_{actual}).$$

The address counter 606 receives as its input, the step size value STEP output by the step size control circuit 604. The starting value of the counter 606 is the address of the first row of tap weights in the memory 32. The address counter 606 is responsible for outputting the memory address used to access the rows of tap weights. The output of the address counter is a value corresponding to the address of one of the I rows of tap weights stored in the memory 32. The counter 606 increments by an amount corresponding to the difference in address values that exists between rows of tap weights in memory times the input value STEP. The counter 606 wraps around to the address of the first row when an increment operation would cause the value stored in the counter to exceed the value of the address of the last row of tap weights.

By adjusting the step size in the above described manner and incrementing an address counter as described, multiple interpolator input sampling rates and interpolation rates can be supported with, depending on the input sampling rate, some or all of the tap weights stored in memory 32 being used.

Consider for example if tap weights were stored in memory for an interpolator supporting $I_{max}$=80. In such a case I=5 can be implemented with STEP=80/5=16.

In such a case, on programmable interpolator clock cycle C1, tap weight row 1 will be selected for use.

On programmable interpolator clock cycle C2, tap weight row 17 will be selected for use.

On programmable interpolator clock cycle C3, tap weight row 33 will be selected for use.

On programmable interpolator clock cycle C4, tap weight row 49 will be selected.

On programmable interpolator clock cycle C5, tap weight row 65 will be selected for use.

In a case where specially designed filters need to be used, it is possible to generate such filters by storing tap weights used to produce such filters in memory. In such an embodiment, the number of filters that can be supported depends on the number of tap weights that can fit in the memory.

Assume filter patterns are stored in memory starting at Rows $R_1$, R2 . . . $R_J$. A programmable parameter called START is defined. If this parameter is programmed to $R_J$, then Row $R_J$ is selected to output the $1^{st}$ symbol. This allows a number of filters to be stored in memory, and use any one of them by merely re-programming the START memory address parameter.

The above discussion of the filter of the present invention has been explained assuming N multipliers are used to implement an N tap Nyquist filter. Some implementations may use fewer hardware resources, e.g., multipliers, by running at higher clock rates and further sharing hardware resources, e.g., by reusing multipliers even further.

The use of a Random Access Memory (RAM) facilitates filter flexibility and allows for the Nyquist characteristics to be easily programmed. If Nyquist characteristics are fixed, e.g., at design or implementation time, then a Read Only Memory (ROM) may be substituted for a RAM memory, to save silicon area.

The programmable filter and modulators of the present invention are suitable for use, e.g., in cable modems and a host of other digital communication applications. For example, in one particular embodiment it has been used to implement an MCNS compliant upstream modulator integrated circuit.

What is claimed is:

1. A circuit for processing digital signals, comprising:
   a finite impulse response filter operating at a clock $F_{S2}$ for performing a filtering and interpolation operation on an input signal having a sample rate of $F_{S1}$, the filter including:
   a memory device for storing a plurality of tap weights;
   a plurality of N re-usable taps coupled to the memory;
   an accumulator coupled to the N taps for summing the values generated by the taps and producing a filter output value every $F_{S2}$ clock cycle; and
   control circuitry for loading the plurality of N re-usable taps with a tap weight stored in memory during each $F_{S2}$ clock cycle.

2. The circuit of claim 1, wherein each one of the plurality of N re-usable taps of the finite impulse response filter includes a delay element and a multiplier.

3. The circuit of claim 2, wherein each one of the re-usable taps includes:
   a delay element; and
   a multiplier.

4. The circuit of claim 3, wherein the delay element of each re-usable tap is part of a shift register including N storage locations.

5. The circuit of claim 2, wherein the memory comprises $I_{max}$ rows of N tap weights, where Imax is an integer value corresponding to a maximum interpolation rate supported by the finite impulse response filter.

6. The circuit of claim 5, wherein the control circuitry loads a row of tap weights as a function of a step size determined from an interpolation rate of the finite impulse response filter.

7. The circuit of claim 6, wherein the interpolation rate is equal to $F_{S2}/F_{S1}$.

8. The circuit of claim 1, further comprising:
   a digital mixer coupled to the output of the finite impulse response filter circuit; and
   a digital interpolator having a fixed interpolation rate coupled to the digital mixer.

9. The circuit of claim 8, wherein the digital interpolator is a band-shifting interpolator which shifts the carrier frequency of an information signal included in the signal output by the mixer.

10. A digital modulator, comprising:
    a programmable interpolator for receiving a first digital signal having a first sample rate and for performing an interpolation operation thereon to generate a second digital signal having a second sample rate which is I times the first sample rate, where I is an integer;
    a digital mixer coupled to the first interpolator circuit for performing a mixing operation on the second digital signal; and
    an interpolator circuit having a fixed interpolation rate coupled to the mixer for generating a third signal having a third sampling rate that is higher than the second sampling rate.

11. The digital modulator of claim 10, wherein the interpolator circuit is a band-shifting interpolator circuit which shifts the carrier frequency of the interpolated signal.

12. The digital modulator of claim 10, wherein the programmable interpolator is a finite impulse response filter having an output sample rate that is I times the first sample rate.

13. The digital modulator of claim 12, wherein the programmable interpolator includes:
    a memory for storing a plurality of tap weights;
    a plurality of filter taps; and
    an accumulator for combining the output of the filter taps to generate the second output signal.

14. The digital modulator of claim 12, wherein the programmable interpolator operates at a clock rate that is I times the first sample rate, the digital modulator further including:
    means for loading tap weights from the memory into the filter taps during each programmable interpolator clock cycle.

15. The digital modulator of claim 14, wherein the filter taps are re-usable, the programmable interpolator further including:
    an address counter for generating the starting address in memory where the filter weights to be used during a particular interpolator clock are stored.

16. The digital modulator of claim 15, wherein the means for loading tap weights includes:
    means for loading a first through $n^{th}$ filter tap with a corresponding first through $n^{th}$ tap weight stored sequentially in the memory starting at a memory location corresponding to an address generated by the address counter.

17. The digital modulator of claim 16, further comprising:
    address counter incrementing circuitry for incrementing the address counter by a fixed step size once for every programmable interpolator clock cycle.

18. The digital modulator of claim 17, further comprising:
    means for setting the fixed step size as a function of the interpolation rate I to be performed by the programmable interpolator.

19. The digital modulator of claim 12, wherein the finite impulse response filter is a complex finite impulse response filter capable of processing both in-phase and quadrature phase signals.

20. The digital modulator of claim 15,
    wherein the number of re-usable filter taps included in the programmable interpolator is N, where N is the number of taps used to implement a Nyquist filter capable of performing a pulse shaping operation capable of satisfying a pre-determined communication standard, when the interpolation rate is equal to 1.

21. The digital modulator of claim 14, wherein the programmable interpolator includes N filter taps which are reused I times to process each sample received by the programmable interpolator.

22. The digital modulator of claim 21, where I is equal to a pre-selected fixed output sampling rate divided by the input sampling rate.

23. The digital modulator of claim 10, wherein the programmable interpolator has a fixed output sample rate and supports a plurality of input sampling rates, the programmable interpolator comprising:
    a counter for generating memory addresses used to access tap weights stored in memory; and
    a counter increment generator which increments the counter as a function of one of the input sampling rate.

24. A method of processing a first signal having a sampling rate of $F_{S1}$, the method comprising the step of:

performing a finite impulse response filtering operation on the first signal, the filtering operation including the steps of:

loading N filter taps using a set of tap weights stored in a memory;

utilizing the N filter taps to generate a first filter output value;

repeating the loading and utilizing steps a total of I times for each received input thereby generating an output signal having a sampling rate of $F_{S2}$, where $F_{S2}$ is equal to I times $F_{S1}$ and where I is an integer.

25. The method of claim 24, further comprising the step of:

storing $I_{max}$ sets of N tap weights into memory before performing the filtering operation, where $I_{max}$ is an integer value representing the maximum interpolation rate supported by the loaded tap weights.

26. The method of claim 24, wherein the step of loading N filter taps using a set of tap weights stored in a memory includes the step of:

selecting one of the $I_{max}$ sets of tap weights as a function of the implemented interpolation rate I.

27. The method of claim 26, the step of selecting one of the $I_{max}$ sets of tap weights as a function of the implemented interpolation rate I includes the step of selecting a different set of tap weights when a first interpolation rate is implemented than is used when a second interpolation rate is implemented.

28. The method of claim 25, further comprising the step of:

supplying the values generated by the filtering operation to a digital mixer;

operating the digital mixer to perform a mixing operation to thereby generate an additional signal having a sampling rate of I times $F_{S1}$.

29. The method of claim 28, further comprising the step of:

performing an interpolation operation on the additional signal using an interpolator circuit having a fixed interpolation rate.

30. The method of claim 29, wherein the step of performing an interpolation operation includes the step of performing a band-shifting operation to shift the frequency of a carrier signal included in the additional signal output by the digital mixer.

* * * * *

UNITED STATES PATENT AND TRADEMARK OFFICE
CERTIFICATE OF CORRECTION

PATENT NO. : 6,031,431

DATED : February 29, 2000

INVENTOR(S) : Sanjay R. Vinekar

It is certified that error appears in the above-identified patent and that said Letters Patent is hereby corrected as shown below:

Column 7, line 13, after "clock" insert --rate--.

Signed and Sealed this

Twentieth Day of June, 2000

Attest:

Q. TODD DICKINSON

Attesting Officer

Director of Patents and Trademarks